Figure 1:
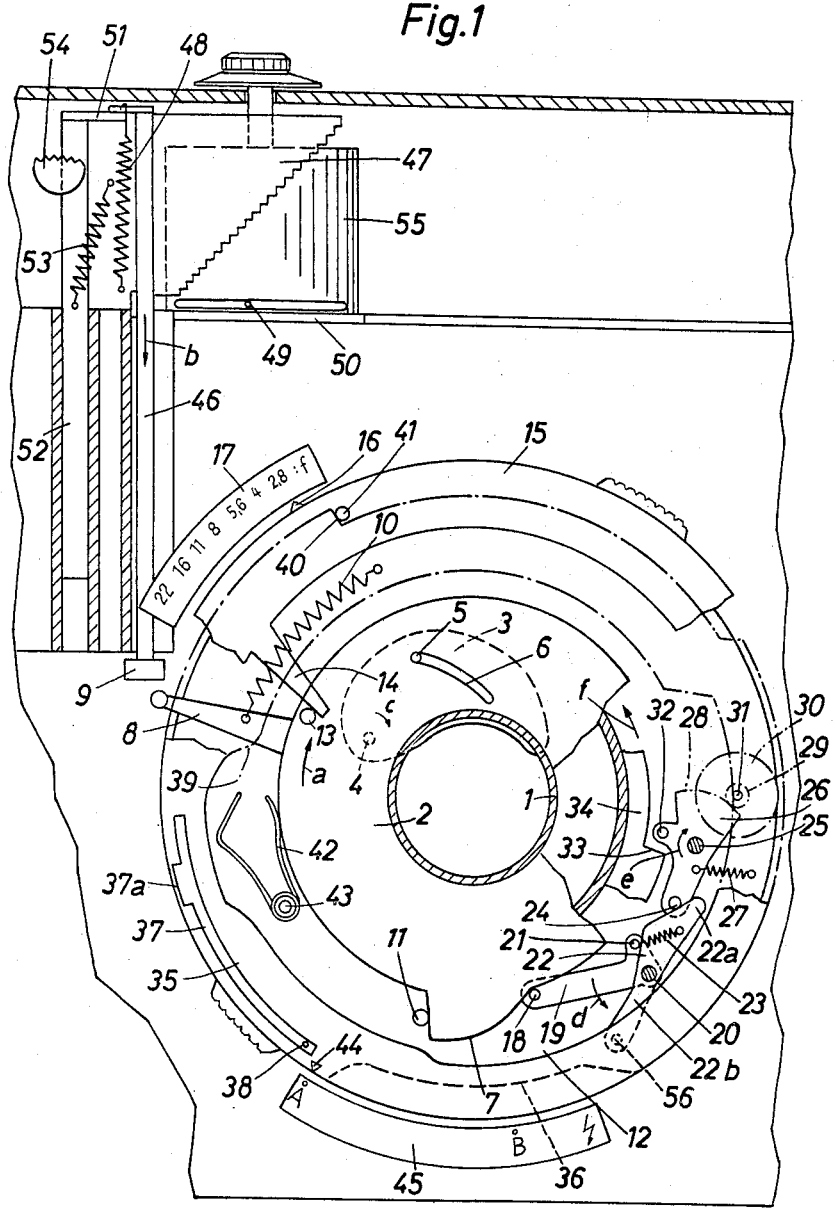

Aug. 31, 1965   G. KIPER   3,203,330
CAMERA CAPABLE OF BEING MANUALLY AND AUTOMATICALLY OPERATED
Filed Nov. 6, 1961   2 Sheets-Sheet 1

INVENTOR.
GERD KIPER
BY
Michael S. Striker
Attorney

United States Patent Office 3,203,330
Patented Aug. 31, 1965

3,203,330
CAMERA CAPABLE OF BEING MANUALLY
AND AUTOMATICALLY OPERATED
Gerd Kiper, Unterhaching, near Munich, Germany, assignor to Agfa Aktiengesellschaft, Leverkusen-Bayerwerk, Germany
Filed Nov. 6, 1961, Ser. No. 150,316
Claims priority, application Germany, Nov. 12, 1960,
A 36,009
11 Claims. (Cl. 95—64)

The present invention relates to cameras.

More particularly, the present invention relates to cameras which are capable of being operated either automatically or manually.

While cameras of this general type are known at the present time, such cameras are quite expensive because of the large number of complex elements required for such cameras.

It is a primary object of the present invention to provide a camera of this type which is composed of a relatively small number of simple inexpensive components so that the operation of the camera of the invention is quite simple and at the same time it is also inexpensive.

A further object of the present invention is to provide a camera of this type composed for the most part of elements which are of such a simple construction that they can be manufactured by stamping operations, for example.

A still further object of the present invention is to provide a camera of the above type which is extremely simple to operate.

With these objects in view the invention includes, in a camera, a support means and a retarding means which is adjustable and which is carried by the support means for controlling the exposure time. A diaphragm means is also carried by the support means for adjusting the exposure aperture, and this diaphragm means includes an exposure time controlling portion. A lever means is carried by the support means and cooperates on the one hand with the exposure time controlling portion of the diaphragm means and on the other hand with the retarding means for adjusting the latter according to actuation of the lever means by the exposure time controlling portion of the diaphragm means, and in this way during automatic actuation of the diaphragm means for automatically setting the diaphragm the exposure time will also be automatically determined. In accordance with the present invention there is also provided a manual control means which is carried by the support means for movement between an automatic position and at least one additional position. In the automatic position of the manual control means the aperture and exposure time can be automatically determined in the above-described manner. However, when the manual control means is moved to its other position, which is to say away from its automatic position, this manual control means cooperates with the above-mentioned lever means to set the retarding means to provide an exposure time determined by the manual control means, and at this time the diaphragm means through its exposure time controlling portion will not provide any adjustment of the retarding means, and furthermore at this time it is possible to manually set the diaphragm, so that in this way manual operation may be provided at the option of the operator.

Figure 2:
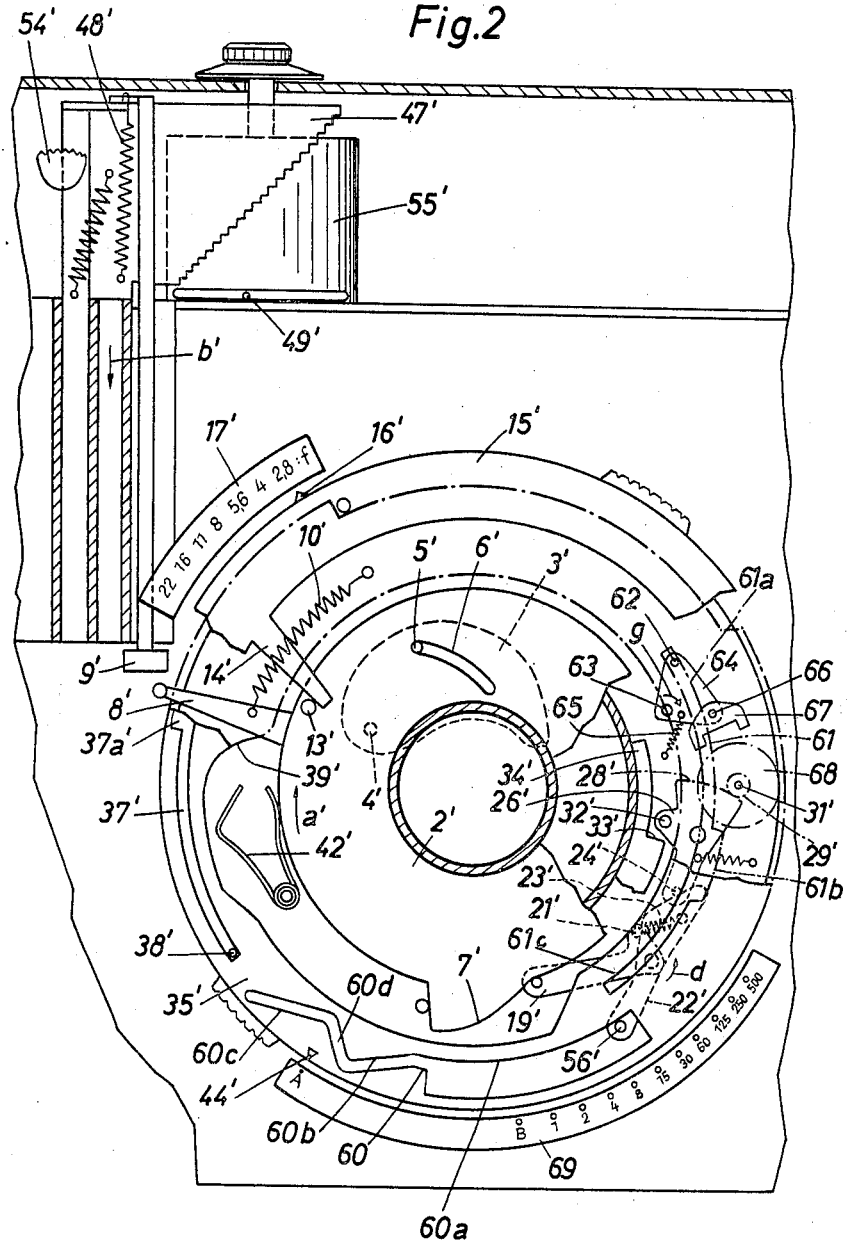

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a fragmentary partly sectional elevation of one possible embodiment of a structure according to the present invention; and FIG. 2 is a fragmentary partly sectional elevation of another embodiment of a structure according to the present invention.

Referring now to FIG. 1, there is illustrated therein an inner central tube 1 of the objective assembly, the axis of this tube 1 coinciding with the optical axis of the objective and the lenses of the objective are carried by the tube 1 in the interior thereof. The exterior surface of the tube 1 forms part of a support means for the structure shown in FIG. 1, and this exterior surface serves to support for rotary movement a diaphragm ring 2 which forms part of the diaphragm means of the structure of the invention. In a plane which is located behind and which is parallel to the plane in which the ring 2 is located, both of these planes being normal to the optical axis, is located an unillustrated stationary diaphragm ring. Between both of these rings are located diaphragm blades 3, of which only one is illustrated for the sake of clarity. Each of these blades 3 fixedly carries a pair of pins 4 and 5, and the pins 5 of the several blades 3 respectively extend into the control slots 6 which are formed in the ring 2, and one of these control slots 6 is shown in the drawing with the pin 5 of the blade 3 shown in the drawing extending into the slot 6. The other pin 4 of each blade 3 extends into an opening of the stationary, unillustrated diaphragm ring. Thus, whenever the ring 2 turns the slots 6 thereof will move relative to the pins 5 for turning the blades 3 with respect to the turning axes respectively provided by the pins 4, and in this way the diaphragm means adjusts the exposure aperture of the camera.

The diaphragm means of the invention includes an exposure time controlling portion, and for this purpose the diaphragm ring 2 is provided at its outer periphery with a projection having a camming edge 7 which will control the exposure time. Moreover, the diaphragm ring 2 fixedly carries, as being formed integrally therewith, an arm 8 which extends radially from the ring 2 and which has an outer free end located in the path of downward movement of the lower end portion 9 of an elongated rod 46 which forms part of a light-responsive means for automatically setting the camera. A spring means is provided for yieldably maintaining the diaphragm means in a predetermined rest position, the diaphragm means being shown in this rest position in FIG. 1, and this spring means is formed by the spring 10 one end of which is connected to the arm 8 and the other end of which is connected to a stationary part of the camera. The spring 10 urges the diaphragm ring 2 to turn in the direction of the arrow $a$, and the turning of the diaphragm ring 2 in this direction is limited by the engagement of an edge portion at the outer periphery of the ring 2 with the stationary pin 11 which is fixedly carried by a stationary plate 12 of the assembly. In addition, the rotary diaphragm ring 2 fixedly carries a pin 13 which is located in the path of movement of a projection 14 of a rotary manually operable diaphragm setting means 15, so that the elements 14 and 13 from a motion transmitting structure for transmitting turning movement of the manually operable diaphragm setting ring 15 to the rotary diaphragm ring 2. The rotary diaphragm setting means 15 is provided with an index 16 which cooperates with a stationary scale 17 which carries graduations which indicates sizes of the exposure aperture, this scale 17 as well as the index 16 and the ring 15 being located at the exterior of the camera, and the scale 17 is carried by any suitable stationary structure such as the front wall of the camera.

A control lever means 19 is turnably supported by a stationary pivot pin 20 which is fixedly carried by a stationary part of the camera, and this control lever means 19 includes a pin 18 engaged by the exposure time controlling portion 7 of the diaphragm means. The control lever means 19 also carries a stop pin 21 which is engaged by an edge of an adjusting lever means 22 which serves to adjust a retarding means described below and provided to set the exposure time. The adjusting lever means 22 is also supported for turning movement by the stationary pin 20, and a spring 23 is connected to the pin 21 as well as to a part of the lever 22 for transmitting movement of the lever 19 to the lever 22, this spring 23 yieldably maintaining an edge of the lever 22 in engagement with the pin 21. This lever 22 is a two-armed lever having the arms 22a and 22b. This adjusting lever means 22, at its arm 22a, engages not only the pin 21 but also a pin 24 of the retarding means, this retarding means including the gear sector 26 which is supported for rotary movement by a stationary pin 25 carried by a stationary part of the camera. Thus, the lever 26 has a gear sector portion 28 and is connected to a spring means 27 in the form of an elongated coil spring connected at one end to the lever 26 and at its opposite end to a stationary part of the camera for urging the lever 26 to turn in a counterclockwise direction, as viewed in FIG. 1, so that in this way the pin 24 of the retarding means is maintained in engagement with an edge of the arm 22 of the adjusting lever means 22. The end of the spring 27 distant from the lever 26 may be fixedly connected to the stationary plate 12. The gear sector portion 28 meshes with a pinion 29 which is fixed coaxially with a rotary mass 30, the assembly 29, 30 being supported for free rotary movement by a shaft 31 which is fixed to the gear 29 and the mass 30 and which is supported for free rotary movement by unillustrated stationary bearings. In addition, the lever 26 of the retarding means carries a pin 32 which is located in the path of turning movement of an edge 33 of a rotary shutter ring which during turning will in a well known manner actuate the blades of the shutter, this ring 34 being fragmentarily illustrated and being of a well known conventional construction.

The support means also supports for rotary movement a manually operable control means formed by a ring 35, and this ring 35 is provided with a camming portion 36 which cooperates with arm 22b of the adjusting lever means 22 by engaging a pin 56 carried by this arm 22b when the control ring 35 is manually turned in a counterclockwise direction from the position shown in FIG. 1 where the control ring 35 has been manually set to provide automatic operation. In addition, in order to provide a B-setting for the exposure time, at which, as is well known, the exposure time can be manually controlled with the shutter blades remaining open as long as the operator maintains the shutter controlling plunger depressed, the ring 35 has a portion provided with an elongated cutout 37 which receives a pin 38 which controls the B-setting of the exposure time in a well known manner through actutaion of an unillustrated well known structure. In addition, the manually operable control means 35 has an edge portion 39 which cooperates with a spring 42 which acts as a holding means for holding the diaphragm in a manually set position, and in addition the ring 35 has an edge portion 40 cooperating with a stationary pin 41 carried by the ring 15. The location of the edge portion 40 of the manually operable control ring 35 and the pin 41 of the manually operable diaphragm setting 15 is such that when the ring 35 is turned by the operator to the illustrated position for automatic operation of the camera the ring 15 will become automatically located in that position which provides the maximum aperture of the diaphragm. The edge portion 39 of the ring 35 engages the holding spring 42, which is coiled at an intermediate portion about the stationary pin 43 which is carried by the plate 12, for urging the right free leg of the spring 42 against the outer periphery of the rotary diaphragm ring 2 in order to provide a frictional resistance to turning of the ring 2, and this frictional resistance is too great to be overcome by the spring 10. In order to be able to set the manually operable control means 35, this ring 35 carries an index 44 which cooperates with a scale 45 having the graduation A for indicating the setting for automatic operation, and this control means 35 is capable of being moved by the operator to at least one additional position where manual setting of the exposure time is obtained, the particular scale 45 of FIG. 1 having a graduation B indicating the B-setting of the exposure time as well as a graduation indicating the proper setting of the ring 35 to provide for flash illumination.

The light-responsive means for automatically setting the camera according to the lighting conditions includes in addition to the portion 9 and the rod 46 at the lower end of which the portion 9 is located, the scanning plate 47 which is fixed to the rod 46 for movement therewith, the rod 46 being guided for vertical movement. A spring 48 is fixed at its lower end to a stationary part of the camera and at its upper end to a plate which is fixed to the top end of the rod 46, so that this spring 48 urges the rod 46 downwardly, as indicated by the arrow b, and the scanning plate 47 is located over a pointer 49 of a light meter 55, this pointer 49 being capable of moving freely over a support plate 50 which is located directly beneath and spaced only slightly below the pointer 49 so the extent to which the latter can be deflected by the scanning plate 47 is limited and in this way the light meter cannot be injured by cooperation of the scanning plate 47 and the pointer 49. The light meter 55 can be angularly turned in a well known manner to a selected angular position for introducing into the camera the factor of the speed of the film which is used in the camera. The light-responsive means further includes an elongated plunger 52 which is also guided for vertical movement, and a spring 53 is connected at its lower end to plunger 52 and at its upper end to a stationary part of the camera so as to urge the plunger 52 upwardly to the rest position thereof as indicated in FIG. 1, and the spring 53 being stronger than the spring 48. At its upper end the plunger 52 carries a plate 51 which extends beneath the plate which is fixed to the upper end of the rod 46, so that when the plunger 52 is raised by the spring 53 to return to its rest position, the plate 51 will act on the rod 46 to return the latter to the illustrated rest position where the spring 48 is of course tensioned. A manually engageable element 54 is accessible at the exterior of the camera and is fixed to the plunger 52 so that when the operator depresses the manually engageable member 54 the plunger 52 will move downwardly. Of course, in the rest position of the light-responsive means, this rest position being shown in FIG. 1, the scanning plate 47 is at an elevated location spaced from the pointer 49 which can move freely in accordance with the lighting conditions, the light meter 55 being operatively connected to any suitable photosensitive means such as a photocell or the like, as is well known in the art.

In order to automatically set the camera, with the manually operable control means 35 in the automatic position shown in FIG. 1, it is only necessary for the operator to depress the manually engageable element 54 so as to move the plunger 52 downwardly in opposition to the spring 53. The rod 46 is released in this way for downward movement by the spring 48, and of course this downward movement will continue until the scanning plate 47 engages the pointer 49 of the meter 55 and presses this plunger 49 against the support plate 50. During this downward movement of the rod 46 the enlarged end 9 thereof will engage the arm 8 and move this arm 8 together with the rotary diaphragm ring 2 in the direction of the arrow $a$. This will result of course in turning of the slots 6 of the ring 2 with respect to the pins 5 so that in this way the several blades 3 of the diaphragm turn in the direction of the arrow $c$ shown in the drawing with respect to the blade 3 therein and in this way the aperture of the diaphragm means will be reduced. The rotary movement of the diaphragm ring 2 will cause the exposure time controlling portion 7 of the diaphragm means to turn control means 19 in the direction of the arrow $d$ about the pivot 20, and inasmuch as the spring 23 is stronger than the spring 27 this spring 23 will act as a spring means transmitting movement of the lever means 19 to the lever means 22 so that the latter lever means turns together with the lever 19 and by engaging the pin 24 of the retarding means the retarding means will be automatically adjusted in this way to provide an automatically determined exposure time. The lever 26 of the retarding means is thus turned at this time in the direction of the arrow $e$ about the stationary pivot 25. Of course, the turning of the lever 26 causes the gear sector 28 to turn the pinion 29 and thus the position of the pin 32 of the lever 26 will be adjusted. When the shutter is released, in a well known manner which does not form part of the present invention and which is not illustrated in the drawing, the shutter ring 34 will turn in the direction of the arrow $f$ until its edge 33 engages the pin 32 of the retrading lever 26, and through this engagement through the pin 32 the edge 33 will turn the lever 26 until the pin 32 rides off the outer tip of the edge 33, and when the lever 26 is driven by the pressure of the edge 33 against the pin 32 the turning of the lever 26 at this time is resisted by the rotary mass 30 which is driven by the sector 28 and the pinion 29, so that in this way the automatically determined exposure time is provided. Thus, in accordance with the extent to which the ring 2 is turned by the light-responsive means the exposure time controlling portion 7 of the diaphragm means will act to position the pin 32 at a position with respect to the edge 33 which will provide an automatically determined exposure time.

If it is desired to make an exposure with a B-setting of the shutter, then the manually operable control means 35 is turned until its index 44 is aligned with the graduation B of the scale 45, and in this way the edge 36 of the ring 35 has been placed in a position where it engages the pin 56 and prevents turning of the adjusting lever 22, so that even if the ring 2 should at this time turn so as to cause the edge 7 to turn the control lever 19, the result will be only that the spring 23 will be tensioned and it will be incapable of transmitting any turning movement to the lever 22 since this lever will now be held in the position indicated by engagement of the pin 56 with the edge 36. On the other hand, when the index 44 is aligned with the graduation B, the wider portion 37a of the slot 37 becomes aligned with the pin 38 so that this pin 38 can move into the portion 37a and thus when the shutter is actuated the blades thereof will in a well known manner be maintained open until the operator releases the shutter-operating plunger. Of course, when the ring 35 has been manually turned to this position the edge 39 thereof has engaged the left free leg of the spring 42 so as to urge the right leg thereof as viewed in the drawing, against the periphery of the ring 2. Inasmuch as the frictional engagement between the spring 42 and the ring 2 at this time is greater than the force of the spring 10, this spring 10 will be incapable of returning the ring 2 from the position to which it is manually turned to the position shown in the drawing. In addition, the turning of the ring 35 to the position where the index 44 is aligned with the graduation B of the scale 45 results in movement of the edge 40 from the pin 41 of the ring 15, and the extent of turning of the ring 35 to locate the index 44 in alignment with the graduation B locates the edge 40 away from the pin 41 by an angular distance sufficient to provide the entire range of turning of the ring 15 to provide any desired setting of the diaphragm within the capacity of the camera. Thus, all that is required at this time to provide any desired setting of the aperture is for the operator to turn the ring 15 so as to locate the index 16 in alignment with the selected graduation of the scale 17. The projection 14 of the ring 15 will engage the pin 13 of the ring 2 so as to manually turn the ring 2 at this time in a direction opposite to that indicated by the arrow $a$, and of course the spring 42 will at this time hold the ring 2 in its manually set position. In the event that it is desired to make an exposure with flash illumination, then the ring 35 is manually turned beyond the B position until the index 44 is aligned with the symbol of the scale 45 which indicates flash operation, and at this time the pin 56 remains in engagement with the edge 36 so that the turning of the lever 19 even at this time will be incapable of transmitting through the spring 23 any motion to the lever 22, and thus the retarding means will remain in the illustrated position where it provides a suitable exposure time for flash illumination on the order of, for example, 1/30 sec. At the same time, in this position the spring 42 serves to hold the ring 2 in whichever position it is manually moved to by turning of the ring 15, this ring 15 acting through the projection 14 on the pin 13 to turn the ring 2, and of course the turning of the ring 2 will cause the slots 6 thereof to act on the pins 5 to position the diaphragm blades 3 in the manner described above. Thus, in this position also the spring 42 will guarantee that the diaphragm will remain in the position in which it is manually set. It is only possible for the diaphragm to be returned to its starting position when the ring 35 is returned to the position where the index 44 is aligned with the graduation A of the scale 45, since in this position the edge 39 of the ring 35 moves away from the spring 42 so as to release the ring 2 to be acted upon by spring 10.

While with the embodiment of FIG. 1 it is possible to provide manually determined exposure times either in the B position or in the flash-illumination position of the ring 35, the embodiment of the invention which is illustrated in FIG. 2 permits the operator to select any one of a number of exposure times. Referring to FIG. 2, those parts which correspond to elements of FIG. 1 are indicated by the same reference characters primed. Thus, the rotary manually operable control ring 35' is again formed with an elongated cutout 37' to receive the pin 38' which controls the shutter in the B position where the exposure time is determined by manual actuation of the shutter-operating plunger, and in addition it is possible to control the shutter so as to provide by manual selection any one of a number of exposure times within a range of from 1 second to 1/500 sec. in the illustrated example. For this purpose the ring 35' is provided with an elongated slot 60 which forms a camming means capable of providing the selected exposure time. In addition, the manually operable control means 35' has a portion formed with an elongated cutout 61 which serves to control an escapement so as to move the escapement into or out of an operative position for a purpose described below. The camming slot 60 of the control ring 35' has three regions 60a, 60b and 60c, the regions 60b and 60c being interconnected by a relatively short region 60d. When the ring 35' is turned away from the automatic position thereof shown in FIG. 2 to move through a predetermined range which does not include the automatic position shown in FIG. 2, the pin 56' of the adjusting lever 22' will be received in the camming slot 60 so that this camming slot 60 will now control the position of the lever 22' and in this way it will be possible, as will be apparent from the description which follows, to provide a manually selected exposure time between the maximum and minimum exposure times of the camera. However, when the pin 56' is located in the region 60a of the slot 60, this region 60a being considerably wider than the remaining portion of the slot 60, then the pin 56' is free to turn without any influence on the lever 22' by the ring 35', so that as long as the pin 56' is located in the region 60a fully automatic operation of the camera is possible. It is only when the pin 56′ becomes located in the narrow left end portion of the region 60a or in the other regions 60b or 60c that the angular position of the lever 22′ will be manually set. The region 60a of the cutout 60 is wide enough to permit the lever 22′ to be turned in the direction of the arrow d through an angle sufficient to provide in an automatic manner the shortest possible exposure time. The elongated cutout 61 is also divided into several portions, namely, the portions 61a, 61b, and 61c. The portions 61a and 61c extend along a circle whose center is in the optical axis and form a slot receiving the pin 62 for controlling the position of the lever 64 so as to maintain this lever 64 in the position indicated in FIG. 2. The lever 64 is supported for turning movement by a stationary pin 63 and is urged by a spring 65 to turn in the direction of the arrow g of FIG. 2, but as long as the pin 62 is either in the portion 61a or in the portion 61c of the elongated arcuate cutout 61 the lever 64 will be in the position shown in the drawing. An escapement 67 is pivotally carried by the lever 64 through the pivot pin 66, and this escapement 67 is adapted to cooperate with the teeth of the gear 68 which when it is not engaged by the escapement 67 will simply act as a rotary mass similar to the mass 30 of FIG. 1. When the ring 35′ is turned to an angular position where the pin 62 is received in the wider portion 61b of the slot 61, the spring 65 will be capable of turning the lever 64 to a position which places the escapement 66 in operative engagement with the gear 68. This gear 68 of course has the construction of escapement wheel which cooperates with the anchor 67, and the gear or wheel 68 is fixed coaxially to a pinion 29′ which is supported together with the element 68 for rotary movement by the shaft 31′, this pinion 29′ meshing with the gear sector 28′ of the lever 26′ of the retarding means of FIG. 2.

The embodiment of FIG. 2 also provides a scale which cooperates with the index 44′ of the ring 35′ for indicating to the operator the proper setting of the ring 35′, and this scale 69 is provided with the graduation A indicating the automatic setting and with the graduation B indicating the B setting, and after this latter graduation are located a series of conventional exposure time settings.

In order to make an automatic exposure with the embodiment of FIG. 2, the manually operable control means 35′ is moved so as to position its index 44′ in alignment with the graduation A of the scale 69, and this is the position shown in the drawing. With the parts in this position the operator merely depresses the manually engageable element 54′ of the light-responsive means so that in the manner described above the portion 9′ of this light-responsive means will move downwardly by a distance determined by the lighting conditions, and thus the arm 8′ will turn so as to turn the ring 2′ and set the aperture. Of course, the spring 10 is tensioned at this time but it is incapable of preventing turning of the ring 2′ by the spring 48′ which is stronger than the spring 10′, and the same relationship obtains between the spring 48 and the spring 10 of FIG. 1. The turning of the rotary ring 2′ will move the slots 6′ with respect to the pins 5′ so as to turn the blades 3′ about the pivots 4′ respectively, and thus the size of the exposure aperture is automatically provided in accordance with the lighting conditions. At the same time the exposure time controlling portion 7′ of the diaphragm means of FIG. 2 provides a turning of the control lever 19′ in the direction of the arrow d, and through the spring 23′ the turning the lever 19′ will be transmitted to the adjusting lever 22′, the pin 56′ at this time being located in the wider portion 60a of the slot 60, so that the adjusting lever 22′ is free to turn in order to act through the pin 24′ of the retarding means on the lever 26′ thereof so as to set the exposure time in a fully automatic manner also in accordance with the lighting conditions. With the manually engageable element 54′ maintained in its depressed position, the operator will release the shutter so as to make an exposure in the manner described above, and then upon release of the element 54′ the parts will return to the rest position.

In order to make an exposure with the B-setting of the shutter, the ring 35′ is manually turned until its index 44′ is aligned with the graduation B of the scale 16′. In this position the pin 3′ will have the wider portion 37a′ of the slot 37′ in alignment therewith, so that when the shutter is actuated pin 38′ can now move into the wider portion 37a′ so that the shutter will be maintained open as long as the operator maintains the shutter-actuating plunger depressed. At this time, the pin 56′ is located in the left, narrow end portion of the part 60a of the elongated cutout 60, so that the lever 22′ cannot be turned from the position indicated in FIG. 2, and also at this time the pin 62 is still in the narrower portion 61a of the slot 61, although at this time the pin 62 is closely adjacent to the wider portion 61b. Also, upon moving the ring 35′ to the position aligning the index 44′ with the graduation B of the scale 69, the edge 39′ of the ring 35′ has engaged the spring 42′ to provide the above-described frictional resistance to turning of the ring 2′ by the spring 10′, so that the ring 2′ will now remain in whatever angular position it is placed in by the operator upon turning of the ring 15′ which through the projection 14′ acts on the pin 13′ of the ring 2′ to turn the latter, as described above in connection with FIG. 1. Thus, in the B-position of the control means 35′, the operator can choose any aperture simply by turning the ring 15′ so as to align its index 16′ with a selected graduation of the scale 17′.

When the operator turns the ring 35′ beyond the point where its index 44′ is aligned with the graduation B of the scale 69, in the direction which is opposite to that indicated by the arrow a′, then the slot 37′ moves with a portion thereof which is not shown in FIG. 2 and which is located beyond the wider portion 37a′ along the pin 38′ which thus again is prevented from moving to provide an operation where the shutter remains open as long as the operating plunger thereof is manually depressed. Moreover, the pin 56′ is received in the portion 60b of the cam or cutout 60, and the pin 62 is now received in the wider portion 61b of the elongated slot 61. As soon as the wider portion 61b of the slot 61 becomes aligned with the pin 62, the spring 65 turns the lever 64 in the direction of the arrow g so as to place the anchor escapement 67 in engagement with the escapement wheel 68. Moreover, because the position of the pin 56′ is now controlled by the camming slot portion 60b, the angular position of the adjusting lever 22′ will now be manually controlled, and this lever will act through the pin 24′ of the lever 26′ to adjust the angular position of the lever 26′ of the retarding means of FIG. 2, and in this way the position of the pin 32′ with respect to the edge 33′ of the shutter ring is controlled to provide in a manual way a selected exposure time. Engagement of the control portion 7′ of the diaphragm means with the lever 19′ will have no influence on the lever 22′ at this time since the camming slot portion 60b by cooperation of the pin 56′ will prevent any turning of the lever 22′ as a result of turning of the lever 19′ and tensioning of the spring 23′. As long as the selected exposure time is between 1 second and 1/15 sec., the pin 62 remains in the wider portion 61b of the slot 61 and the pin 56′ remains in the camming slot portion 60b, so that during this range of exposure times the escapement mechanism is operative. However, when the operator turns the index 44′ from the exposure time graduation 1/15 sec. to the exposure time graduation 1/30 sec. of the scale 69, the portion 60d of the camming slot 60 actuates the pin 56′ to again locate it in the angular position indicated in FIG. 2 so that the lever 22′ is now returned to the position shown in FIG. 2, but the pin 56′ at this time is located at the right end of the camming slot portion 60c, and simultaneously with this turning of the ring 35′, the lower edge of the portion 61b of the slot 61 acts on the pin 62 to turn the lever 64 in opposition to the spring 65 back to the angular position shown in FIG. 2 so that the anchor of the escapement mechanism is again placed in an inoperative position where it is incapable of cooperating with the escapement wheel 68. Now the rotary gear or escapement wheel 68 will simply operate as a rotary mass in the same way as the mass 30 of FIG. 1. Thus, during the continued turning of the ring 35' by the operator to provide exposure time of 1/30 sec. and smaller, the lever 22' will again be placed manually in a selected angular position which will locate the pin 32' in a predetermined position with respect to the edge 33' of the shutter ring 34', but at this time the retarding mechanism will operate without the escapement mechanism so as to provide the shorter exposure times.

Throughout the entire range of turning of the ring 35' between the point where the index 44' is aligned with the graduation B and the point where the index 44' is aligned with the graduation 500 of the scale 69, the edge 39' cooperates with the spring 42' to provide on the ring 2' sufficient frictional resistance to turning to prevent the spring 10' from moving the ring 2', and thus the aperture will remain during this time in the position manually selected by turning of the ring 15'.

It will be understood that each of the elements described above or two or more together, may also find a useful application in other types of cameras differing from the types described above.

While the invention has been illustrated and described as embodied in cameras capable of being operated manually or automatically, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a camera, in combination, support means; adjustable retarding means carried by said support means for controlling the exposure time; diaphragm means carried by said support means for controlling the exposure aperture, said diaphragm means having an exposure time controlling portion; an adjusting lever turnably carried by said support means and cooperating with said retarding means for adjusting the latter according to the angular position of said adjusting lever; a control lever also turnably carried by said support means, said control lever cooperating with said exposure time controlling portion of said diaphragm means to be actuated thereby and cooperating with said adjusting lever for turning the latter in response to actuation of said control lever by said exposure time controlling portion of said diaphragm means for adjusting said retarding means when the camera is automatically operated; and manually operable control means carried by said support means for movement between an automatic position providing automatic operation of the camera and at least one additional position providing manual operation of the camera, said control means when it is in said automatic position thereof providing no influence on said adjusting lever so that the latter is automatically adjusted upon actuation of said control lever by said exposure time controlling portion of said diaphragm means, and said control means actuating said adjusting lever to adjust the retarding means independently of actuation of said control lever by said exposure time controlling portion of said diaphragm means when said manually operable control means in said one position thereof.

2. In a camera, in combination, support means; adjustable retarding means carried by said support means for controlling the exposure time; diaphragm means carried by said support means for adjusting the exposure aperture, said diaphragm means having an exposure time controlling portion; an adjusting lever turnably carried by said support means and cooperating with said retarding means for adjusting the same according to the angular position of said adjusting lever; first spring means cooperating with said retarding means for yieldably urging the latter to a predetermined rest position, so that when said retarding means is adjusted by said adjusting lever said adjusting lever acts in opposition to said first spring means; a control lever turnably carried by said support means and actuated by said control portion of said diaphragm means; second spring means stronger than said first spring means cooperating with said control lever and adjusting lever for transmitting movement of said control lever to said adjusting lever; and manually operable control means carried by said support means for movement between an automatic position and at least one additional position providing manual setting of the aperture and exposure time, said control means when in said automatic position thereof having no influence on said adjusting lever so that said adjusting lever is turned to adjust said retarding means according to actuation said control lever by said exposure time controlling portion of said diaphragm means, and said control means when in said one position thereof preventing transmission of movement of said control lever to said adjusting lever through said second spring means and cooperating with said adjusting lever for placing the latter in a position providing a manually selected exposure time.

3. In a camera, in combination, support means; adjustable retarding means carried by said support means for controlling the exposure time; diaphragm means carried by said support means for controlling the exposure aperture, said diaphragm means having an exposure time controlling portion; an adjusting lever turnably carried by said support means and cooperating with said retarding means for adjusting the latter according to the angular position of said adjusting lever; a control lever also turnably carried by said support means, said control lever cooperating with said exposure time controlling portion of said diaphragm means to be actuated thereby and cooperating with said adjusting lever for turning the latter into response to actuation of said control lever by said exposure time controlling portion of said diaphragm means for adjusting said retarding means when the camera is automatically operated; and manually operable control means carried by said support means for movement between an automatic position providing automatic operation of the camera and at least one additional position providing manual operation of the camera, said control means when it is in said automatic position thereof providing no influence on said adjusting lever so that the latter is automatically adjusted upon actuation of said control lever by said exposure time controlling portion of said diaphragm means, and said control means actuating said adjusting lever to adjust the retarding means independently of actuation of said control lever by said exposure time controlling portion of said diaphragm means when said manually operable control means in said one position thereof, said support means supporting said adjusting lever and said control lever for rotary movement about a common axis.

4. In a camera, in combination, support means; retarding means carried by said support means for controlling the exposure time, said retarding means being adjustable; diaphragm means carried by said support means for controlling the exposure aperture, said diaphragm means having an exposure time controlling portion; adjusting lever means turnably carried by said support means and cooperating with said retarding means for adjusting the latter to set the exposure time in accordance with the angular position of said adjusting lever means; control lever means turnably carried by said support means and actuated by said exposure time controlling portion of said diaphragm means; spring means operatively connected to said control lever means and said adjusting lever means for transmitting movement of said control lever means to said adjusting lever means during automatic operation of the camera; and manually operable control means carried by said support means for movement between an automatic position where said control means has no influence on said adjusting lever means to provide automatic setting of the exposure time as well as of the exposure aperture and said manually operable control means being carried by said support means for movement through a predetermined range of movement when said control means is located beyond the automatic position thereof, said control means having a portion formed with an elongated cut-out which forms a camming means and which, when said control means moves along said predetermined range of movement thereof receives a portion of said adjusting lever means for turning the latter to adjust said retarding means according to the position of said manually operable control means within said predetermined range of movement thereof and independently of said control lever means so that the exposure time may be manually set by said manually operable control means when the latter is in said range of movement thereof.

5. In a camera, in combination, support means; retarding means carried by said support means for controlling the exposure time, said retarding means being adjustable; diaphragm means carried by said support means for controlling the exposure aperture, said diaphragm means having an exposure time controlling portion; adjusting lever means turnably carried by said support means and cooperating with said retarding means for adjusting the latter to set the exposure time in accordance with the angular position of said adjusting lever means; control lever means turnably carried by said support means and actuated by said exposure time controlling portion of said diaphragm means; spring means operatively connected to said control lever means and said adjusting lever means for transmitting movement of said control lever means to said adjusting lever means during automatic operation of the camera; and manually operable control means carried by said support means for movement between an automatic position where said control means has no influence on said adjusting lever means to provide automatic setting of the exposure time as well as of the exposure aperture and said manually operable control means being carried by said support means for movement through a predetermined range of movement when said control means is located beyond the automatic position thereof, said control means having a portion formed with an elongated cutout which forms a camming means and which, when said control means moves along said predetermined range of movement thereof receives a portion of said adjusting lever means for turning the latter to adjust said retarding means according to the position of said manually operable control means within said predetermined range of movement thereof and independently of said control lever means so that the exposure time may be manually set by said manually operable control means when the latter is in said range of movement thereof, said cutout of said control means being in the form of an elongated camming slot and said adjusting lever means including a pin which is located in said slot when said manually operable control means is in any position located along said predetermined range of movement thereof.

6. In a camera as recited in claim 5, said retarding means including an escapement and a lever carrying said escapement for moving the latter during turning of said lever between operative and inoperative positions, and said manually operable control means having a second portion formed with cutout forming a second camming means cooperating with the lever which carries said escapement for moving the latter to its operative position during relatively long exposure times and away from its operative position during relatively short exposure times.

7. In a camera, in combination, support means; retarding means carried by said support means for determining the exposure time, said retarding means being adjustable; diaphragm means carried by said support means for determining the exposure aperture; spring means cooperating with said diaphragm means for yieldably maintaining the latter in a predetermined position; automatic means cooperating with said diaphragm means for automatically actuating the latter in opposition to said spring means for setting the aperture automatically; manually operable diaphragm setting means carried by said support means and cooperating with said diaphragm means for manually setting the latter in opposition to said spring means; exposure time control means operatively connected to said diaphragm means to be actuated when said diaphragm means is moved from said predetermined position thereof; lever means actuated by said exposure time control means and cooperating with said retarding means for adjusting the latter to automatically determine the exposure time when said diaphragm means is automatically actuated; and manually operable control means carried by said support means for movement between an automatic position and at least one additional position, said manually operable control means in said automatic position thereof having no influence on said lever means so that the automatic actuation of said diaphragm means will also result in automatic determination of the exposure time and said manually operable control means in said one position thereof controlling the position of said lever means independently of said diaphragm means so that when said manually operable control means in said one position thereof said manually operable diaphragm setting means can be manually actuated to set the diaphragm while the exposure time will be determined by said manually operable control means.

8. In a camera, in combination, support means; retarding means carried by said support means for determining the exposure time, said retarding means being adjustable; diaphragm means carried by said support means for determining the exposure aperture; spring means cooperating with said diaphragm means for yieldably maintaining the latter in a predetermined position; automatic means cooperating with said diaphragm means for automatically actuating the latter to opposition to said spring means for setting the aperture automatically; manually operable diaphragm setting means carried by said support means end cooperating with said diaphragm means for manually setting the latter in opposition to said spring means; exposure time control means operatively connected to said diaphragm means to be actuated when said diaphragm means is moved from said predetermined position thereof; lever means actuated by said exposure time control means and cooperating with said retarding means for adjusting the latter to automatically determine the exposure time when said diaphragm means is automatically actuated; manually operable control means carried by said support means for movement between an automatic position and at least one additional position, said manually operable control means in said automatic position thereof having no influence on said lever means so that the automatic actuation of said diaphragm means will also result in automatic determination of the exposure time and said manually operable control means in said one position thereof controlling the position of said lever means independently of said diaphragm means so that when said manually operable control means in said one position thereof said manually operable diaphragm setting means can be manually actuated to set the diaphragm while the exposure time will be determined by said manually operable control means; and means actuated by said manually operable control means when the latter is displaced from said automatic position thereof and cooperating with said diaphragm means for releasably maintaining the latter in the position to which it is manually moved by said manually operable diaphragm setting means in opposition to said spring means.

9. In a camera, in combination, support means; diaphragm means carried by said support means for setting the exposure aperture of the camera, said diaphragm means having an exposure time controlling portion; adjustable retarding means also carried by said support means for adjustably controlling the exposure time; lever means turnably carried by said support means and cooperating with said retarding means for adjusting said retarding means; and manually operable control means carried by said support means for movement between at least one manual control position in which only said manually operable control means cooperates with said lever means for adjusting said retarding means and an automatic position in which only said exposure time controlling portion of said diaphragm means cooperates with said lever means for automatically adjusting said adjustable retarding means during movemnt of said diaphragm means.

10. In a camera, in combination, support means; diaphragm means carried by said support means for setting the exposure aperture of the camera, said diaphragm means having an exposure time controlling portion; adjustable retarding means also carried by said support means for adjustably controlling the exposure time; actuating means movably carried by said support means and cooperating with said retarding means for adjusting said retarding means; and maually operable control means carried by said support means for movement between at least one manual control position in which only said manually operable control means cooperates with said actuating means for adjusting said retarding means and an automatic position in which only said exposure time controlling portion of said diaphragm means cooperates with said actuating means for automatically adjusting said adjustable retarding means during movement of said diaphragm means.

11. In a camera, an arrangement of the type defined in claim 10 wherein said manually operable control means has a portion formed with a cut-out one end of which forms a camming means co-operating with said actuating means when said manually operable control means is in said manual control position thereof.

References Cited by the Examiner
UNITED STATES PATENTS

| | | | |
|---|---|---|---|
| 2,926,571 | 3/60 | Sommer | 95—64 X |
| 2,988,977 | 6/61 | Rentschler | 95—64 |
| 2,999,439 | 9/61 | Nerwin et al. | 95—64 X |
| 2,999,440 | 9/61 | Nerwin | 95—64 X |
| 2,999,441 | 9/61 | Hutchison et al. | 95—64 X |

NORTON ANSHER, *Primary Examiner.*

DELBERT B. LOWE, EVON C. BLUNK, *Examiners.*